(12) United States Patent
Dahlberg

(10) Patent No.: US 9,700,126 B2
(45) Date of Patent: Jul. 11, 2017

(54) MOUNTING DEVICE FOR A DRUM IN A SHAFT OF A BRUSH ROLLER AND A DRUM SEGMENT, A DRUM AND A BRUSH ROLLER

(71) Applicant: SVENSKA INDUSTRIBORSTAR I VÄSTERÅS AB, Västerås (SE)

(72) Inventor: Cecil Dahlberg, Västerås (SE)

(73) Assignee: Svenska Industriborstar I Vasteras AB, Vasteras (SE)

( * ) Notice: Subject to any disclaimer, the term of this patent is extended or adjusted under 35 U.S.C. 154(b) by 0 days.

(21) Appl. No.: 15/021,837

(22) PCT Filed: Sep. 15, 2014

(86) PCT No.: PCT/SE2014/051060
§ 371 (c)(1),
(2) Date: Mar. 14, 2016

(87) PCT Pub. No.: WO2015/041590
PCT Pub. Date: Mar. 26, 2015

(65) Prior Publication Data
US 2016/0227914 A1 Aug. 11, 2016

(30) Foreign Application Priority Data
Sep. 19, 2013 (SE) ..................... 1351078

(51) Int. Cl.
*A46B 7/10* (2006.01)
*A46B 3/14* (2006.01)
(Continued)

(52) U.S. Cl.
CPC .................. *A46B 7/10* (2013.01); *A46B 3/14* (2013.01); *F16B 33/002* (2013.01); *A46B 13/02* (2013.01);
(Continued)

(58) Field of Classification Search
CPC ........... A46B 13/00; A46B 7/00; A46B 13/02; A46B 15/00
(Continued)

(56) References Cited

U.S. PATENT DOCUMENTS 1,475,074 A * 11/1923 McLaughlin ........ A46B 13/003
15/179
2,736,916 A * 3/1956 Lombardi ............ A46B 13/005
15/183

(Continued)

FOREIGN PATENT DOCUMENTS

EP 2664250 11/2013

OTHER PUBLICATIONS

Written Opinion regarding International Application No. PCT/SE2014/051060, mail date May 12, 2014, 8 pages.

*Primary Examiner* — Michael Jennings
(74) *Attorney, Agent, or Firm* — Foley & Lardner LLP

(57) ABSTRACT

The invention relates to a mounting device for a drum (2) consisting of at least two joined drum segments (21, 22) as a part of a shaft (1) of a brush roller, said mounting device including an internal circumferentially directed shoulder (24) being a part of a first drum segment (21) and an external circumferentially directed shoulder (23) being a part of a second drum segment (22), said two shoulders (23, 24) are provided with cooperating contact surfaces mainly positioned in a circumferential or tangential direction with respect to a complete drum (2), the external shoulder (23) being provided with a radial directed clearance hole intended to involve a screw (30), the threaded end of which being directed into the geometrical rotation axis of a complete drum, whereby the interior circumferentially directed shoulder (24) is provided with a recess (26) having a bottom (25) and an opening (27) facing the geometrical rotation axis and the recess (26) is designed with plain inner side surfaces (Continued)

(42, 43) facing each other and being parallel and axial with respect to the drum, and the recess (26) is equipped with projections (28) tangentially and circumferentially originating from each one of said side surfaces and pointing to each other. Furthermore the invention relates to a drum segment, a drum, and a brush roller with such a mounting device.

11 Claims, 1 Drawing Sheet

(51) Int. Cl.
    *F16B 33/00*     (2006.01)
    *A46B 15/00*     (2006.01)
    *A46B 13/02*     (2006.01)
    *E01H 1/05*     (2006.01)

(52) U.S. Cl.
    CPC ....... *A46B 15/00* (2013.01); *A46B 2200/3066* (2013.01); *E01H 1/05* (2013.01)

(58) Field of Classification Search
    USPC .......................................... 15/179, 182, 183
    See application file for complete search history.

(56) References Cited

U.S. PATENT DOCUMENTS

| | | | | | |
|---|---|---|---|---|---|
| 3,533,125 | A | * | 10/1970 | White | A46B 3/14 15/183 |
| 3,862,463 | A | * | 1/1975 | Reiter | A46B 3/14 15/182 |
| 3,995,346 | A | * | 12/1976 | Grogan | A46B 9/02 15/182 |
| 4,018,014 | A | * | 4/1977 | Belanger | B24D 13/06 15/183 |
| 5,251,355 | A | * | 10/1993 | Drumm | A46B 13/005 15/182 |
| 6,279,190 | B1 | * | 8/2001 | Belanger | A46B 3/16 15/230.16 |
| 6,817,055 | B1 | * | 11/2004 | Ekholm | A46B 3/14 15/179 |
| 8,393,044 | B2 | * | 3/2013 | Favagrossa | B60S 3/06 15/230.16 |
| 8,495,786 | B2 | * | 7/2013 | Naftal | A46B 3/00 15/176.6 |
| 8,925,136 | B2 | * | 1/2015 | Huybreckx | A46B 13/001 15/179 |

\* cited by examiner

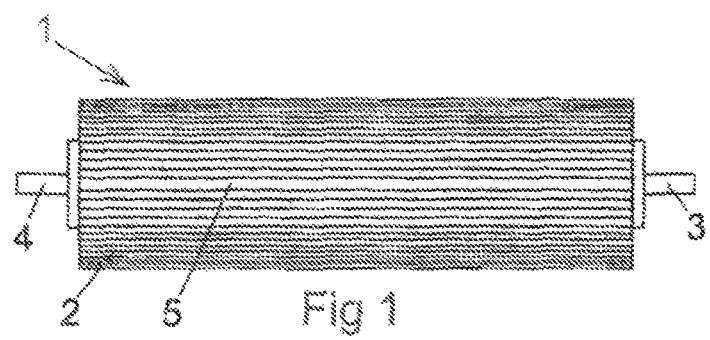
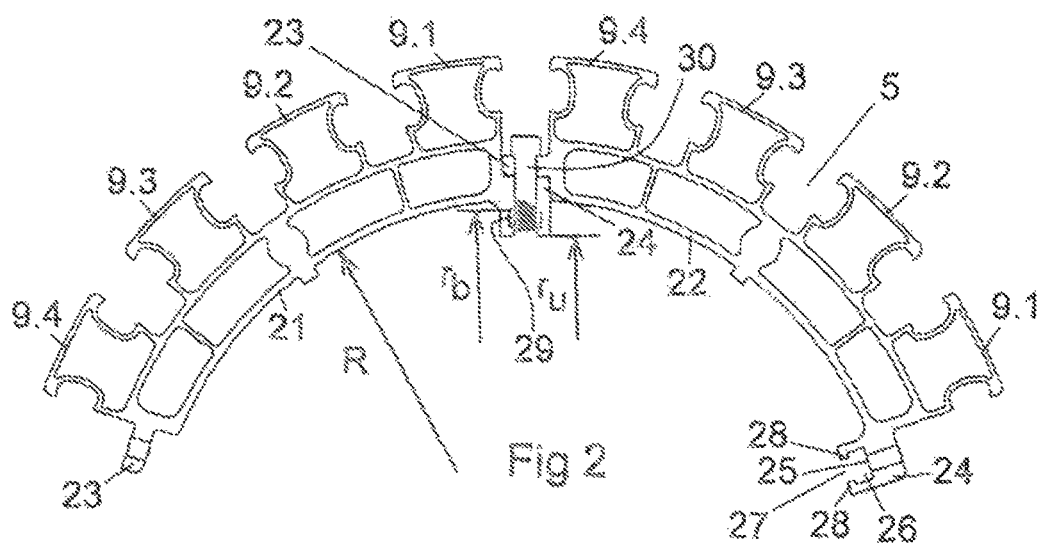
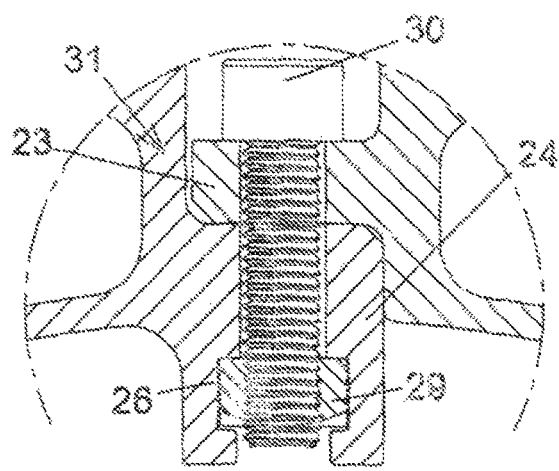
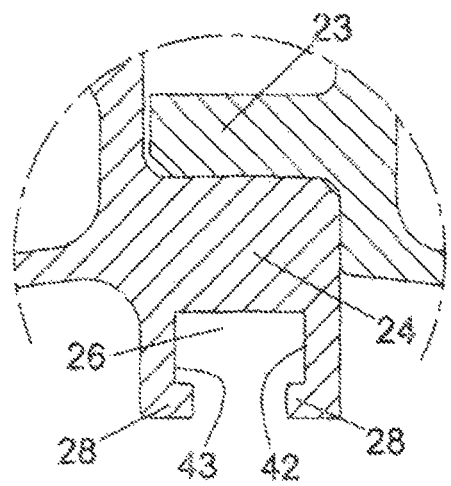

MOUNTING DEVICE FOR A DRUM IN A SHAFT OF A BRUSH ROLLER AND A DRUM SEGMENT, A DRUM AND A BRUSH ROLLER

CROSS-REFERENCE TO RELATED APPLICATIONS

The present Application is a U.S. national stage of and claims priority to and the benefit of International Application No. PCT/SE2014/051060, filed on Sep. 15, 2014, which claims priority to Swedish Application No. 1351078-9, filed on Sep. 19, 2013. Both applications are incorporated herein by reference in their entireties.

TECHNICAL FIELD

The present invention refers to a mounting device for a drum in a shaft of a brush roller. Such brush rollers are used among others for cleaning of airfields and other similar larger areas.

BACKGROUND ART

The background of the invention can be obtained from the Swedish patent SE 521 363 and the corresponding U.S. Pat. No. 6,817,055 showing a method for mounting of a drum and a drum being a part of a shaft as a part of a brush roller. FIG. 5 of these publications shows mounting of two drum segments by a screw running radially through a clearance hole in an external shoulder and into a threaded hole of an internal shoulder. This coupling is a rigid and good coupling for connection of two neighbouring segments but it is hard and time consuming to fit the screw tight against the treaded hole of the internal shoulder during the mounting.

PURPOSE OF THE INVENTION

The purpose of the invention is to provide a mounting device allowing time saving when mounting of two adjacent segments of a drum in a shaft of a brush roller.

DISCLOSURE OF INVENTION

By the present invention as it appears from the independent claims the purposes mentioned above are met with, the disadvantages being eliminated. Suitable developments of the invention are described by the dependent claims.

The invention relates to a mounting device for a drum consisting of at least two joined drum segments as a part of a shaft of a brush roller. The mounting device includes an external circumferentially directed shoulder being a part of a first drum segment, and an internal circumferentially directed shoulder being a part of a second drum segment. The two shoulders are provided with cooperating contact surfaces mainly positioned in a circumferential or tangential direction with respect to a complete drum, the external shoulder is provided with a radial directed clearance hole intended to involve a screw, the threaded end of which being directed into the geometrical rotation axis of a complete drum. Said cooperating contact surfaces being "mainly positioned in a circumferential or tangential direction" involves for instance also combined plane cooperative surfaces together forming a ridge, preferably centrally positioned either on the exterior shoulder or on the interior shoulder, said ridge is cooperating with a corresponding valley at the opposite shoulder, each such cooperating surface being orientated tangentially to a complete drum, that is being orientated in a plane in parallel with a tangential plane of the drum. The interior circumferentially directed shoulder is provided with a recess having a bottom and an opening facing the geometrical rotation axis. The recess is designed with plain inner side surfaces facing each other and being parallel and axial with respect to the drum. Furthermore the recess is equipped with projections tangentially or circumferentially originating from each one of said side surfaces and pointing to each other. The drum segment is made of extruded aluminum and is in form of a double-walled construction to add to the stiffness in flexing of the complete drum, but at the same time being relatively light. By extruding the drum segment one obtains an equal cross-sectional profile along the whole drum segment, such that it is easy to obtain interruptions/openings in the recess by cut or mill off the projections of the recess or the side walls of the recess.

According to an embodiment of the invention the internal restriction surfaces of said projections are located at a radius $r_u$ being less than the radius R of the internal cylindrical surface of the drum segments.

According to an embodiment of the invention the bottom of the recess is located at a radius $r_b$ being less than the radius R of the internal cylindrical surface of the drum segments.

According to an embodiment of the invention a nut of said screw is axially displaceable but rotation locked located in the recess. By interruptions/openings in the recess the nut in an easy way can be moved to a suitable location at the radial directed hole to receive the screw.

According to an embodiment of the invention the nut is located between the side surfaces of the recess having a play between the respective side surface and the side of the nut. The purpose of the play is to offer an adjustment possibility when joining of two drum segments.

According to an embodiment of the invention each one of said shoulders has an extension along the whole length of the respective drum segment. This offers a simple injection moulding method of each drum segment.

According to an embodiment of the invention said recess has an extension along the whole axially length of the drum segment. This offers a simple injection moulding method of each drum segment too.

According to an embodiment of the invention all of the projections has an extension along the whole axially length of the drum segment. This offers a simple injection moulding method of each drum segment too.

The invention also relates to a drum segment for a drum as a part of a shaft of a brush roller. The drum segment is equipped with two or more, preferably four radial projecting beams forming U-shaped recesses between two adjacent beams, said recesses are designed to carry radial directed brushes. The drum segment includes a mounting device according to any one of the embodiments mentioned above, the external circumferentially directed shoulder being arranged along one edge of the drum segment and the internal circumferentially directed shoulder being arranged along the other edge of the drum segment.

The invention also relates to a drum being a part of a shaft of a brush roller. The drum consists of at least two drum segments, preferably four segments, each one defined according to the drum segment mentioned above.

Furthermore the invention relates to a brush roller equipped with radial directed brushes mounted on a drum according to what being mentioned above.

BRIEF DESCRIPTION OF THE DRAWING

Now the invention will be described more in detail with reference to the schematic drawing figures.

FIG. 1 shows a shaft of a brush roller.

FIG. 2 shows a section-view through a section of the drum according to the invention.

FIG. 3 shows a mounting device in an enlarged scale from FIG. 2 according to the invention.

FIG. 4 shows a detail of the invention in a corresponding enlarged scale.

DESCRIPTION OF THE INVENTION

FIG. 1 shows a shaft 1 of a brush roller which shaft consists of a drum 2 and two shaft ends 3, 4. At the external circumference the drum is provided with axially going U-formed cartridge spaces 5 designed for receipt of brush magazines according to what is known per se i. a. from the publications mentioned in the introduction part. The shaft 1 together with the brush magazines as mounted form a complete brush roller.

FIG. 2 shows a radial section-view through a section of the drum with the U-formed cartridge spaces 5, each one formed of two radial protruding beams 9.2, 9.3 and located next to each other. The beams are arranged on drum segments 21, 22 which in the figure comprise four beams 9.1, 9.2, 9.3, 9.4 each. Each drum segment 21, 22 includes a mounting device making it possible to mount a first drum segment 21 at an adjacent second drum segment 22. The mounting device includes the two sides of a drum segment, one side of which being provided with an external circumferentially directed shoulder 23 and the other side is provided with an internal circumferentially directed shoulder 24 as a part of the first drum segment 21. These two shoulders 23, 24 from two adjacent drum segments 21, 22, forming the mounting device, join the first drum segment 21 with the second drum segment 22. FIG. 2 shows that the internal circumferentially directed shoulder 24 has a recess 26 with a bottom 25 having an opening 27 facing the geometrical rotation axis of the drum. Furthermore the recess is equipped with projections 28 tangentially or circumferentially pointing to each other to make it possible for the recess to surround a nut 29. The figure shows that a screw 30 extends through the shoulders 23, 24 joined to overlap each other, and by cooperation with the nut 29 tightening the two drum segments 21, 22 together in a radial direction.

FIG. 3 shows an enlargement of the mounting device 31 of FIG. 2 where the screw 30 is in thread engagement with the nut 29 being located in the recess 26. The screw 30 extends through the exterior circumferentially directed shoulder 23 and the internal circumferentially directed shoulder 24 as well to force the two shoulders against each other when tightening the mounting device.

FIG. 4 shows the external circumferentially directed shoulder 23 and the internal circumferentially directed shoulder 24 being provided with the recess 26 having plain inner side surfaces 42, 43 facing each other and being parallel and axial with respect to the drum. The figure also shows the projections 28 which tangentially or circumferentially originate from each one of said side surfaces and are pointing to each other. Preferably the nut placed in the recess is arranged with a small play with respect to the plain side surfaces to allow adjustments of the nut during the mounting. Thus the recess is provided with side surfaces between which a nut may be slid in an axial way within the recess. Preferably the nut has got the shape of a square nut with large side surfaces, however also hexagon-nuts are conceivable, but then having smaller supporting surfaces with respect to a given recess.

The invention claimed is:

1. A mounting device for a drum comprising at least two joined drum segments as a part of a shaft of a brush roller, said mounting device including an internal circumferentially directed shoulder being a part of a first drum segment and an external circumferentially directed shoulder being a part of a second drum segment, said internal circumferentially directed shoulder and said external circumferentially directed shoulder being provided with cooperating contact surfaces mainly positioned in a circumferential or tangential direction with respect to the drum, the external circumferentially directed shoulder being provided with a radial directed through hole intended to involve a screw having a threaded end, the screw also going through the internal circumferentially directed shoulder and the threaded end being directed towards a geometrical rotation axis of the drum, wherein the interior circumferentially directed shoulder is provided with a recess having a bottom and an opening facing the geometrical rotation axis and the recess is designed with plain inner side surfaces facing each other and being parallel and axial with respect to the drum, and the recess is equipped with projections tangentially and circumferentially originating from each one of said plain inner side surfaces and pointing to each other.

2. The mounting device according to claim 1, wherein the projections include internal restriction surfaces that are located at a radius being less than a radius of an internal cylindrical surface of the two joined drum segments.

3. The mounting device according to claim 2, wherein the bottom of the recess is located at a radius being less than the radius of the internal cylindrical surface of the two joined drum segments.

4. The mounting device according to claim 1, wherein a nut of said screw is axially displaceable but rotation locked and located in the recess.

5. The mounting device according to claim 4, wherein said nut is located between the side surfaces of the recess having a play between the respective side surface and the side of the nut.

6. The mounting device according to claim 1, wherein each of said internal circumferentially directed shoulder and said external circumferentially directed shoulders has an extension along the whole length of the respective drum segment.

7. The mounting device according to claim 1, wherein said recess has an extension along the whole axially length of the first drum segment.

8. The mounting device according to claim 1, wherein all of the projections have an extension along the whole axially length of the first drum segment.

9. A drum segment for a drum being a part of a shaft of a brush roller, said drum segment comprising two or more, radial projecting beams forming U-shaped recesses between two adjacent beams, said U-shaped recesses being designed to carry radial directed brushes, wherein the drum segment includes a mounting device having an external circumferentially directed shoulder and an internal circumferentially directed shoulder, the external circumferentially directed shoulder being arranged along one edge of the drum segment and the internal circumferentially directed shoulder being arranged along an edge other than the one edge of the drum segment, wherein the interior circumferentially directed shoulder is provided with a recess having a bottom and an opening, wherein the recess includes inner side surfaces facing each other, and wherein the recess further includes projections tangentially and circumferentially originating from each one of the inner side surfaces of the recess and pointing to each other.

10. The drum segment according to claim 9, wherein the drum is a part of the shaft of the brush roller, and wherein the drum comprises at least two drum segments.

11. The drum segment according to claim 10, wherein the brush roller is equipped with radial directed brushes, and wherein the brushes are mounted on the drum.

\* \* \* \* \*